United States Patent [19]

Jayne

[11] Patent Number: 4,486,039
[45] Date of Patent: Dec. 4, 1984

[54] INCREASING TRACTION OF ROLLING WHEEL

[76] Inventor: Murray L. Jayne, 1906 NE. River Ct., Jensen Beach, Fla. 33457

[21] Appl. No.: 393,445

[22] Filed: Jun. 29, 1982

[51] Int. Cl.³ .................... B60B 39/06; B60B 39/08; B61C 15/10
[52] U.S. Cl. ...................................... 291/3; 222/504; 222/518; 222/630; 291/36
[58] Field of Search ............... 222/195, 630, 518, 504; 291/3, 36

[56] References Cited

U.S. PATENT DOCUMENTS

| 713,910 | 11/1902 | McLaughlin | 291/3 |
| 847,270 | 3/1907 | Wise | 291/3 X |
| 896,968 | 8/1908 | Barnett | 291/36 X |
| 990,016 | 4/1911 | Shull | 291/3 |
| 2,625,417 | 1/1953 | Sundheim | 291/3 |

Primary Examiner—Howard Beltran
Attorney, Agent, or Firm—Walter L. Schlegel, Jr.

[57] ABSTRACT

A sleeve having a readily removeable attachment to a tank containing gritty particulate supports a piston and cylinder device for opening normally closed valve seats to permit flow of the particulate to the path of a rolling vehicle wheel. The device is actuated to open position by compressed gas which is directed against the particulate flowing through the sleeve only when the valve seats are open.

8 Claims, 3 Drawing Figures

U.S. Patent    Dec. 4, 1984    4,486,039
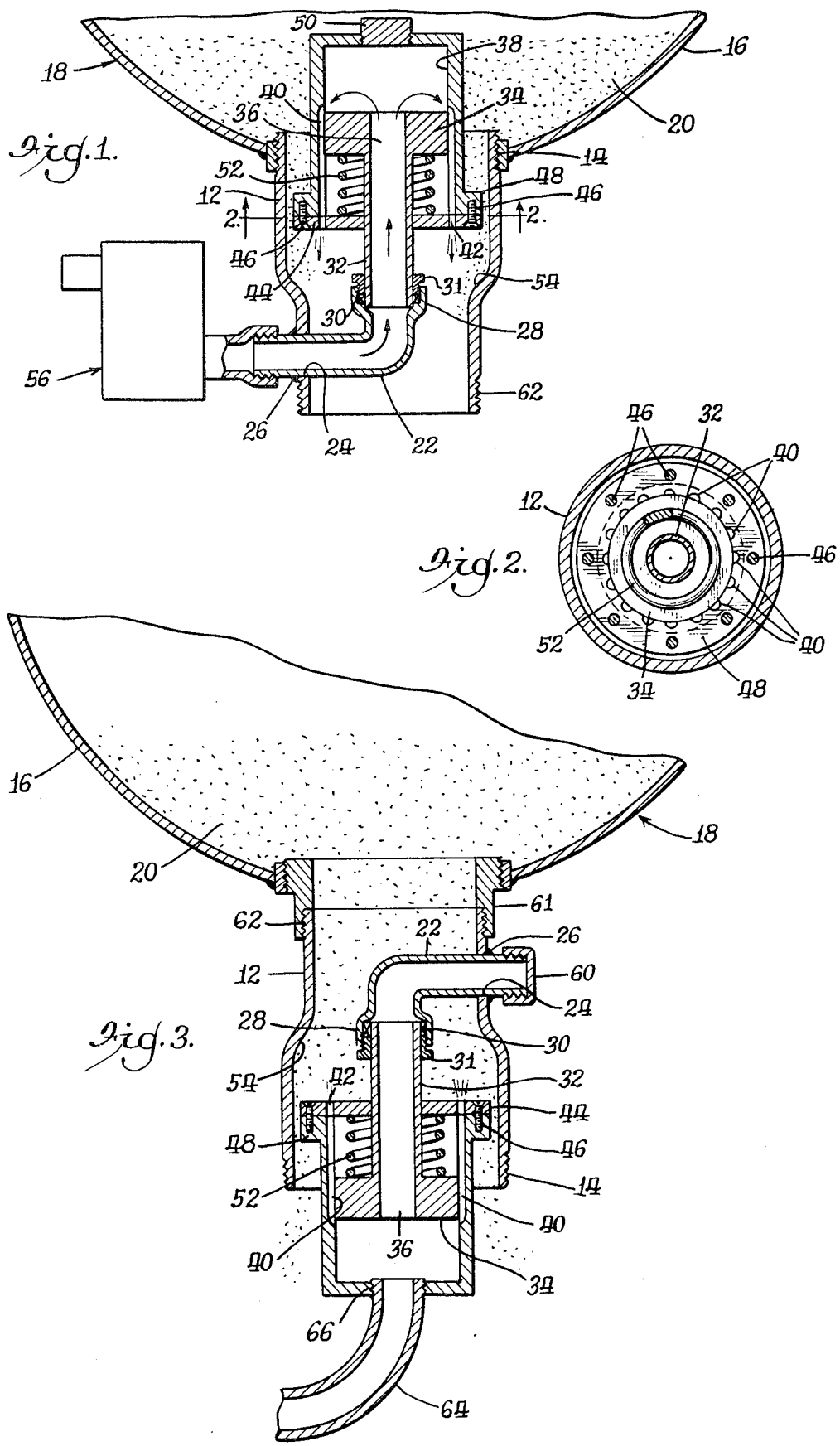

INCREASING TRACTION OF ROLLING WHEEL

This invention relates to a device for delivering a gritty particulate from a source thereof to a wheel of a vehicle or to a surface in front of the wheel on which it is rolling, for the purpose of increasing the coefficient of friction between the wheel and said surface as for example during braking of the wheel.

The invention is particularly effective as applied to a wheel of an over the highway semi-trailer vehicle for preventing jackknifing of the semi-trailer as may occur during braking on a wet, oily, or ice-covered pavement. However, the invention may also be applied to other vehicles such as aircraft or railway vehicles to prevent or minimize skidding particularly during braking of a wheel of such a vehicle.

A primary object of the invention is to devise such a device which is economical to manufacture, simple and strong in design and capable of withstanding the rigors of intensive freight or passenger service.

Another object of the invention is to open such a device by compressed air so that the particulate may flow through the device to the vehicle wheel.

Still another object of the invention is to agitate the particulate by directing compressed gas, such as air, against the particulate as it flows outwardly through the device, thereby breaking up any clumps of the particulate as may occur by caking thereof during a period when the device is closed.

Yet another object of the invention is to attach the device as a unit to the tank which contains the particulate so that the unit may be easily removed for repair or replacement.

The foregoing and other objects and advantages of the invention will become apparent from the following specification and the accompanying drawings, wherein:

FIG. 1 is a central vertical section view of a preferred embodiment of the invention applied to a particulate storage tank of a vehicle such as a highway semi-trailer;

FIG. 2 is a sectional view on line 2—2 of FIG. 1; and

FIG. 3 is a view similar to FIG. 1 showing the same embodiment applied in reverse position to such a tank.

Describing the invention in detail and referring first to FIG. 1, the novel device comprises a sleeve 12 having a readily removable connection as for example by threads 14 to a wall 16 of a particulate tank 18 adapted to hold a supply of a particulate 20 such as sand, salt, crushed cinders or any other suitable material to be discharged through the sleeve 12 in front of, or on top of, a wheel (not shown) of the vehicle (not shown) which carries the tank 18.

An elbow 22 extends through a complementary opening 24 of the sleeve 12 and is sealed in said opening as by a weld 26 to the sleeve 12 around the opening 24 so that the elbow 22 may be supported and sealed in opening 24.

The elbow 22 also comprises within the sleeve 12 an enlarged socket 28 containing a conventional packing gland 30 comprising a nut 31 which clamps a hollow stem 32 of a piston 34 having a central opening 36 communicating with the interior of the hollow stem 32. The packing gland 30 affords an air-tight anchor connection between the stem 32 and the elbow 22 which is anchored to the sleeve at 26 as heretofore described.

The piston 34 has a slideable air-tight fit in a cylinder 38 which has grooves 40 in its inner diameter performing a function hereinafter discussed. Each groove 40 communicates with a port 42 in a cap 44 attached to the cylinder as by bolts 46 extending into an external flange 48 of the cylinder 38. The opposite end of the cylinder 26 is sealed by a threaded plug 50 serving a purpose hereinafter described. The threaded connection between the plug 50 and the cylinder 38 is air-tight except when the plug is removed as hereinafter described.

A compression coil spring 52 surrounds the stem 32 and is compressed between the piston 34 and the cap 44 to bias the cylinder 38 to closed position whereat the bottom edge of the outer diameter of the cap 44 seats in line contact with an annular necked-down portion 54 of sleeve 12 to prevent flow of particulate downwardly through the sleeve 12 to the vehicle wheel or just in front of it.

In the position of FIG. 1, compressed air is admitted through a conventional valve 56 which is normally closed but in FIG. 1 is held open by a solenoid (not shown) so that compressed air flows through elbow 22, hollow stem 32 and piston opening 36 into the cylinder 38 above the piston 34, urging the cylinder 38 upwardly to open position whereat the space in the cylinder 38 above the piston 34 communicates with the grooves 40 so that compressed air flows through the grooves 40 and ports 42 agitating the particulate as it flows downwardly through the sleeve, as shown in FIG. 1, to increase traction between the vehicle wheel and the surface on which it is rolling.

When the operator of the vehicle deenergizes the solenoid the air valve 56 moves to closed position cutting off flow of compressed air to the elbow 22 and opening the elbow 22 to exhaust to atmosphere whereat spring 52 causes cap 44 to seat in line contact with sleeve portion 54 cutting off further flow of particulate from the tank 18 until the operator again energizes the solenoid.

FIG. 3 shows the novel device in inverted position with parts corresponding to those of FIGS. 1 and 2 identified by corresponding numerals.

In FIG. 3, the outer end of the elbow 22 is sealed by a cap 60, and the sleeve 12 has a sealed connection as by threads 62 to an adapter 61 threaded into the wall 16 of the tank 18 to afford a sealed connection thereto. The removable plug 50 has been removed and replaced by a flexible air line 64 having an air-tight sealed connection as by threads 66 to the cylinder opening from which plug 50 has been removed. The air line 64 receives compressed air from the valve 56 (not shown in FIG. 3) which is actuated by a solenoid (not shown in FIG. 3) as previously described in connection with FIGS. 1 and 2.

As the cylinder 38 in FIG. 3 moves to and from the open position of FIG. 3, whereat the cap 44 is spaced from the necked-down portion 54 of sleeve 12, the flexible airline 64 accommodates such movement, and the valve 56 may be attached to a bracket (not shown) on tank 18 or any other part of the vehicle structure as may be convenient.

Also in the embodiment of FIG. 3, if desired, a compressed air line may be connected to the elbow 22 by removing cap 60 in which case the line 64 may be disconnected at 66 and replaced by plug 50, or compressed air could be connected to both the elbow 22 and the line 64 from the air valve 56 to help agitate the particulate 20.

It should be noted that in both FIGS. 1 and 3 the compressed air flowing through ports 42 from grooves 40 in the open position of cylinder 38 agitates the particulate so that it flows freely by gravity downwardly through the sleeve 12 to the wheel below.

What is claimed is:

1. In a device for delivering particulate from a source thereof to a wheel of a vehicle; the combination of a sleeve having means for releasable attachment at its upper end to said source, said sleeve having its lower end aligned to deliver said particulate to or in front of said wheel, normally closed valve means carried by the sleeve for preventing flow of particulate through the sleeve when the valve means are closed, whereby the sleeve and valve means may as a unit be attached to and detached from the source, and means for opening said valve means said valve means comprising a cylinder, a piston anchored to the sleeve and slideably fitted against the internal diameter of said cylinder, a cap secured to one end of said cylinder externally thereof, the outer diameter of said cap being engageable with a facing internal annular seat of said sleeve, the cylinder being moveable axially thereof relative to the sleeve, and spring means compressed between the piston and the inner side of the cap for biasing the cap into engagement with said seat, and said opening means comprising means for delivering compressed gas to a space between said piston and the end of said cylinder spaced from and facing the cap.

2. A device according to claim 1 wherein grooves are provided in the inner diameter of the cylinder for delivering compressed gas through ports in the cap to the particulate to agitate it as it flows through the sleeve when the cap is spaced from the seat.

3. A device according to claim 2 wherein the compressed gas is directed upwardly against the particulate as it flows downwardly through the sleeve.

4. A device according to claim 2 wherein the compressed gas is directed downwardly through the particulate as it flows downwardly through the sleeve.

5. In a device for ejecting gritty particulate from a tank on a vehicle into the path of a wheel of the vehicle rolling on a surface; the combination of a sleeve, a piston anchored to said sleeve, a floating cylinder in the sleeve having a snug slideable fit on said piston, mutually engageable seat means on the radially outer perimeter of said cylinder and in said sleeve for preventing flow of said particulate through said sleeve in a closed position of the cylinder, spring means for biasing the cylinder to said closed position, means for admitting compressed gas to a space between said piston and the end of said cylinder remote from said seat means, whereby the cylinder is actuated to open position, and gas passage means extending from said space along the inner diameter of the cylinder to the opposite end thereof for admitting pressure gas thereto when the cylinder is in open position, for agitating said particulate, and means for attaching one end of the sleeve to the tank around an opening thereof.

6. A device according to claim 5 wherein the seat means are interengageable along substantially line contact.

7. In a device for flowing particulate from a tank of a vehicle into the path of a wheel of the vehicle rolling on a surface; the combination of a sleeve, a piston in said sleeve and anchored thereto, a floating cylinder in the sleeve receiving said piston, mutually engageable seat means fixed to one end of the cylinder at its radially outer perimeter and on said sleeve for preventing flow of said particulate through the sleeve when the cylinder is in its closed position with said seat means interengaged, spring means in said cylinder for biasing the cylinder to said position, and means for admitting compressed gas to a space between the piston and the opposite end of said cylinder remote from said seat means for actuating said cylinder to open position, and a sealed connection between said sleeve and said tank at an opening thereof.

8. In a device for flowing particulate from a tank of a vehicle into the path of a wheel of the vehicle rolling on a surface; the combination of a sleeve, a piston fixedly anchored to said sleeve, a cylinder moveable axially in the sleeve and receiving said piston, a cap removeably attached to one end of the cylinder, mutually engageable seat means on said cap at its radially outer perimeter and on the sleeve for preventing flow of said particulate through the sleeve when said cap is in its closed position with said seat means interengaged, spring means in said cylinder for biasing said cap to said position, and means for admitting compressed gas to a space between the piston and the end of said cylinder remote from said cap for actuating said cap to open position, and a readily detachable sealed connection between said sleeve and said tank around an opening thereof, whereby upon release of said connection the sleeve and the parts therein may be removed from the tank as a unit for quick replacement.

* * * * *